US012128372B2

(12) United States Patent
Manke et al.

(10) Patent No.: US 12,128,372 B2
(45) Date of Patent: Oct. 29, 2024

(54) ROTOR FOR A DEVICE FOR MIXING POWDER AND LIQUID AND DEVICE FOR MIXING POWDER AND LIQUID

(71) Applicant: YSTRAL GMBH MASCHINENBAU + PROCESSTECHNIK, Ballrechten-Dottingen (DE)

(72) Inventors: David Manke, Ballrechten-Dottingen (DE); Hanspeter Seeger, Ballrechten-Dottingen (DE)

(73) Assignee: YSTRAL GMBH MASCHINENBAU + PROCESSTECHNIK, Ballrechten-Dottingen (DE)

( * ) Notice: Subject to any disclaimer, the term of this patent is extended or adjusted under 35 U.S.C. 154(b) by 645 days.

(21) Appl. No.: 17/423,886

(22) PCT Filed: Jan. 14, 2020

(86) PCT No.: PCT/EP2020/050828
§ 371 (c)(1),
(2) Date: Jul. 18, 2021

(87) PCT Pub. No.: WO2020/156806
PCT Pub. Date: Aug. 6, 2020

(65) Prior Publication Data

US 2022/0008874 A1 Jan. 13, 2022

(30) Foreign Application Priority Data

Feb. 1, 2019 (DE) .................... 10 2019 102 585.0

(51) Int. Cl.

| | |
|---|---|
| ***B01F 27/00*** | (2022.01) |
| ***B01F 23/53*** | (2022.01) |
| ***B01F 27/271*** | (2022.01) |

(52) U.S. Cl.
CPC .......... *B01F 27/2711* (2022.01); *B01F 23/53* (2022.01)

(58) Field of Classification Search
CPC ............................ B01F 23/53; B01F 27/2711
See application file for complete search history.

(56) References Cited

U.S. PATENT DOCUMENTS 1,862,906 A 6/1932 Preleuthner
4,175,875 A 11/1979 Van Horbek
(Continued)

FOREIGN PATENT DOCUMENTS

DE 29608713 U1 8/1996
EP 0132035 A2 1/1985
(Continued)

OTHER PUBLICATIONS

PCT International Search Report (PCT/EP2020/050828), Date of Issuance: Apr. 21, 2020.
(Continued)

*Primary Examiner* — Anshu Bhatia
(74) *Attorney, Agent, or Firm* — Kevin R. Erdman; Brannon Sowers & Cracraft PC

(57) ABSTRACT

In the case of a rotor (109) for a device for mixing powder and liquid, a number of connecting arms (203) are formed, as a connecting structure, between an outer blade carrier plate (215), which is equipped with outer blades (127), and a shaft receptacle (117), between which connecting arms there are situated liquid outlet regions (206). This has the result, owing to a relatively high throughput with a shear action which is still sufficient, of a relatively high mixing rate and of a relatively low tendency for powder to agglutinate.

13 Claims, 8 Drawing Sheets

(56) References Cited

U.S. PATENT DOCUMENTS

| | | | | | |
|---|---|---|---|---|---|
| 4,176,972 | A * | 12/1979 | Stiling | .................. | B28C 5/0881 366/304 |
| 6,210,118 | B1 | 4/2001 | Egawa | | |
| 9,643,336 | B1 * | 5/2017 | Krivohlavek | ......... | B01F 27/813 |
| 2018/0264419 | A1 * | 9/2018 | Grimm | ............... | B01F 27/2711 |

FOREIGN PATENT DOCUMENTS

| | | | |
|---|---|---|---|
| EP | 0304604 | A2 | 3/1989 |
| EP | 3421120 | A1 | 1/2019 |
| FR | 2282932 | A1 | 3/1976 |
| WO | 2007/085798 | A1 | 8/2007 |
| WO | 2016/205345 | A1 | 12/2016 |

OTHER PUBLICATIONS

PCT International Preliminary Report on Patentability (PCT/EP2020/050828), Date of Issuance: Oct. 28, 2020.

* cited by examiner

ROTOR FOR A DEVICE FOR MIXING POWDER AND LIQUID AND DEVICE FOR MIXING POWDER AND LIQUID

This application is a National Stage filing of International PCT/EP2020/050828 filed Jan. 14, 2020, entitled "ROTOR FOR A DEVICE FOR MIXING POWDER AND LIQUID AND DEVICE FOR MIXING POWDER AND LIQUID", claiming priority under 35 U.S.C. § 119 to German Patent Application Serial Number 102019102585.0, filed Feb. 1, 2019, the disclosures of which are incorporated by reference herein.

BACKGROUND OF THE INVENTION

The invention relates to a rotor for a device for mixing powder and liquid according to the preamble of claim 1.

The invention also relates to a device for mixing powder and liquid with a rotor of this type.

A rotor and a device of this type are known from EP 3 421 120 A1. The known rotor has an outer blade carrier plate and a number of radially outwardly located outer blades extending in an axial direction, which are molded onto the outer blade carrier plate. A connecting structure formed between the outer blade carrier plate and a centrally arranged shaft receptacle is formed by a number of connecting arms extending between the outer blade carrier plate and the shaft receptacle. The outer blade carrier plate, the shaft receptacle, and the connecting arms are in one plane in this rotor.

From EP 0 132 035 A2, an open-edged stirrer with a base plate and with a cover plate arranged at a distance from the base plate and having triangular blades on the radial outside is known. A shaft holder is attached in the middle of the base plate. The base plate has recesses radially on the outside of the shaft receptacle. The cover plate is connected to the base plate via a number of plate-like struts. The cover plate is designed with a central recess surrounding the shaft receptacle.

Another rotor and a device equipped with this are known from EP 3 069 786 A1. This known rotor has an outer blade carrier plate and a number of radially outwardly located outer blades extending in an axial direction, which are molded onto the outer blade carrier plate. Furthermore, as a connecting structure between the outer blade carrier plate and a centrally arranged shaft receptacle, there is a circular inner plate thickened with respect to the outer blade carrier plate.

U.S. Pat. No. 1,862,906 A and DE 296 08 713 U1 disclose rotors for a device for mixing powder and liquid, which are designed with an outer blade carrier plate which has a number of connecting arms.

SUMMARY OF THE INVENTION

The invention is based on the object of specifying a rotor of the type mentioned at the outset and a device equipped with a rotor of this type with a relatively high throughput and a relatively low tendency to agglutinate on a powder side.

In the case of a rotor of the type mentioned at the outset, this object is achieved according to the invention with the characterizing features of claim 1.

This object is achieved in a device according to the invention with the features of claim 7.

The fact that between the outer blade carrier plate and the connecting arms connecting webs extending in the axial direction and between the connecting arms, fluid regions tapering radially inward are formed, through which a relatively high throughput of liquid is created also in the radial direction, results in a relatively large liquid surface as well as a relatively high flow rate of liquid and thus an overall relatively high material throughput with a low tendency to agglutinate.

Further expedient refinements of the invention are the subject matter of the dependent claims.

Further useful embodiments and advantages of the invention emerge from the following description of embodiments of the invention with reference to the figures of the drawing.

DESCRIPTION OF EMBODIMENTS OF THE INVENTION

Figure 1:
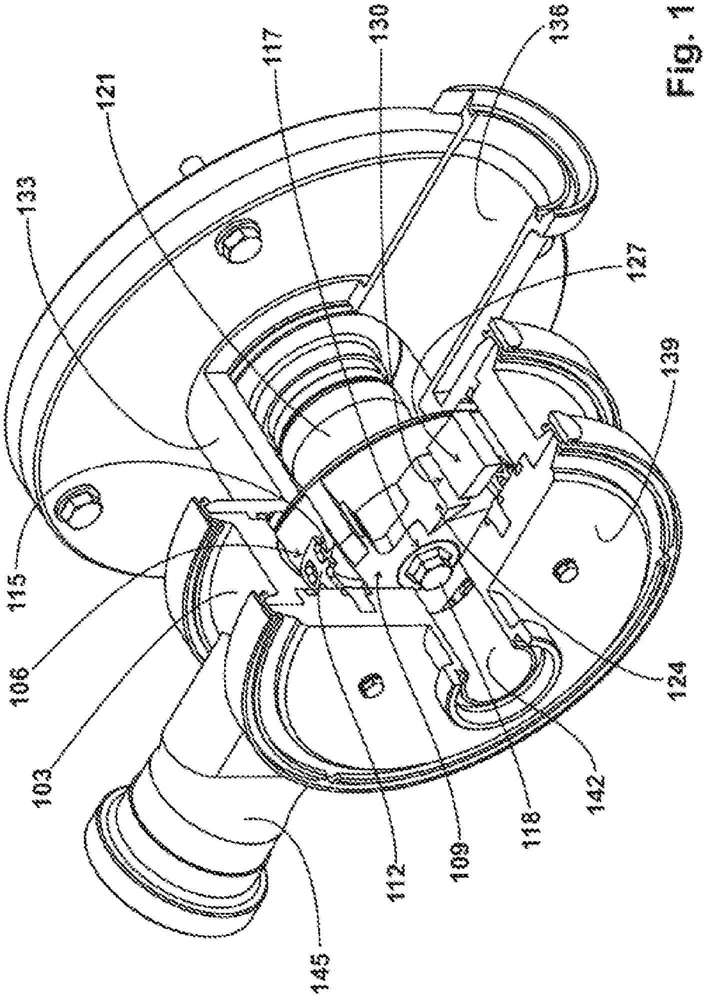
FIG. 1 is a perspective, partially sectioned view of an embodiment of a device according to the invention with an embodiment of a rotor according to the invention.

FIG. 1 is a perspective, partially sectioned view of an embodiment of a device for mixing powder and liquid according to the invention. The embodiment according to FIG. 1 is equipped with a process chamber housing 103 in which a stator 106, which is fixed with respect to the process chamber housing 103, and a rotor 109, which can rotate with respect to the stator 106, are arranged.

The stator 106 has a circumferentially closed, cylinder-like annular wall 112 which is formed with mixing passage recesses 115.

The rotor 109 is connected to a motor-driven drive shaft 121 via a rotor fastening screw 118 arranged in the region of a centrally located shaft receptacle 117. The rotor 109 has a number of shear blades 124 which lie radially on the inside and a number of outer blades 127 which lie radially on the outside and extend in each case approximately in the axial direction and between which an annular wall receiving gap 130 is formed, into which, when the stator 106 and the rotor 109 are arranged as intended, the ring wall 112 is inserted.

Furthermore, it can be seen from FIG. 1 that the drive shaft 121 is surrounded in portions by a liquid supply chamber housing 133, which is tightly flanged to the process chamber housing 103 and is designed with a radially aligned liquid supply connector 136. When the liquid supply connector 136 is connected to a liquid supply line (not shown in FIG. 1), liquid can be supplied into the process chamber housing 103 on the side facing away from the shear blades 124.

On the side facing away from the liquid supply chamber housing 133, a process chamber cover 139 is flanged to the process chamber housing 103, which is formed with an axially aligned powder supply connector 142. When the powder supply connector 142 is connected to a powder supply line (not shown in FIG. 1), powder can be supplied to the process chamber housing 103 on the side facing the shear blades 124.

The process chamber housing 103 is in turn formed with a radially aligned mixture outlet connection 145, via which the mixture of powder and liquid formed in the process chamber housing 103 can be discharged via a mixture discharge line (not shown in FIG. 1) with the interaction of the stator 106 and the rotor 109.

Figure 2:
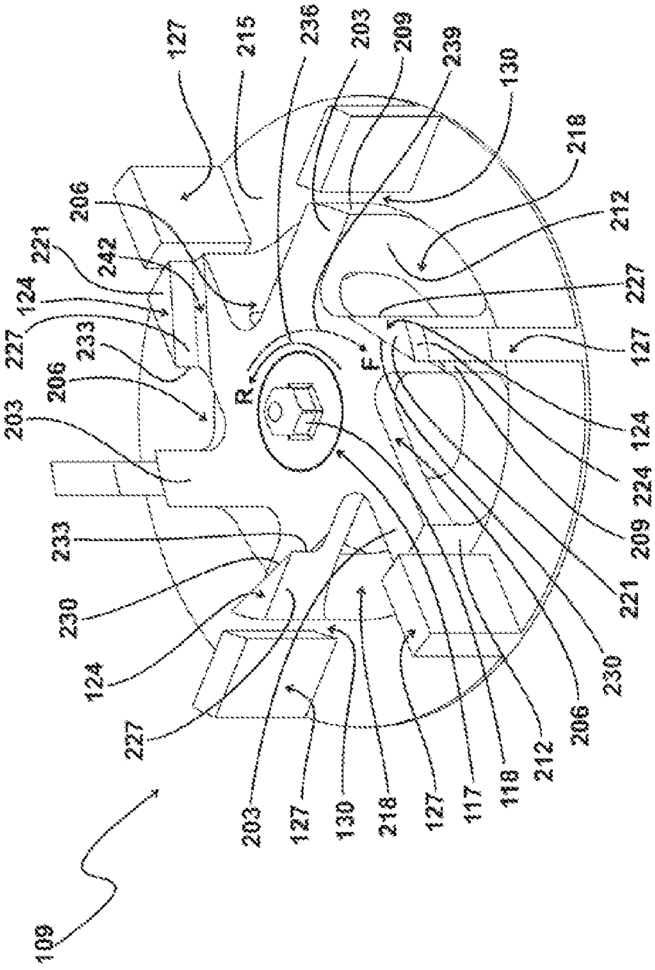
FIG. 2 is a perspective view of an embodiment of a rotor according to the invention.

FIG. 2 shows a perspective view of an embodiment of a rotor 109 according to the invention, which can be used in a device according to the invention and in particular in a corresponding embodiment according to FIG. 1. The embodiment of a rotor 109 according to the invention shown in FIG. 2 has, in addition to the elements already explained in connection with FIG. 1, as a connecting structure, a number of strut-like connecting arms 203, which in this embodiment lie in a plane, the rotor fastening screw 118 being arranged in the middle region of the plane. The shear blades 124 are formed radially on the outside of some connecting arms 203 and extend away from the connecting arms 203 in an axial direction.

A number of radially inwardly tapering liquid outlet regions 206 is provided as free regions between the connecting arms 203 extending in a star-like manner away from the shaft receptacle 117, which liquid outlet regions extend in each case over the same angular sections and are regularly distributed over the circumference of the connecting arms 203. In this embodiment, the end faces 209 of the connecting arms 203 lying radially on the outside on a circular circumference lie opposite the outer blades 127 in the radial direction.

On the radially outer ends of the connecting arms 203, on the side opposite the shear blades 124, connecting webs 212 extending in the axial direction are formed, on the ends of which an outer blade carrier plate 215 is formed facing away from the connecting arms 203. The outer blade carrier plate 215 has the shape of a circular ring and is arranged in a plane that is axially parallel offset with respect to the connecting arms 203, so that a liquid passage channel 218 is formed between adjacent connecting webs 212.

The outer blade carrier plate 215 carries the outer blades 127, which are substantially cuboid, and extend with the long sides thereof in the radial direction and in the axial direction from the outer blade carrier plate 215 into the plane, in which the upper sides 221 of the shear blade facing away from the connecting arms 203 124 lie.

In this embodiment, the shear blades 124 are designed in each case in the basic shape of an acute-angled triangular wedge, the tip region of which points radially inward. A radially outwardly facing end wall 224 of each wedge-like shear blade 124 is rounded off with a radius corresponding to the circumference of the end faces 209 of the connecting arms 203. Side walls 227, 230 of each shear blade 124 of this type are planar and converge at an acute angle to a sharp end edge 233 extending in the axial direction as the end face.

As can be seen from FIG. 2, the wedge-like shear blades 124 are positioned in relation to the radial direction in such a way that the end edges 233 lie at the front during mixing, as intended in a direction of rotation R of the rotor 109, indicated by a solid arrow 236, in relation to a main component indicated by dashed arrows 239, of the direction of rotation R supplemented by a radial component in the opposite direction of flow F.

This results in an effective rear flow of the flow dynamically on the leeward side, i.e. on the rear side wall 230 with laminar proportions on the rear side in relation to a main flow direction, and thus a reduction in the risk of disruptive deposits and adhesions on the rear side wall 230.

To further reduce the risk of disruptive deposits and adhesions on the rear side wall 230 and for an effective deflection of the mixture of powder and liquid when performing a mixing process in the direction of the annular wall 112, it is useful that the front side wall 227 in the flow direction F with the diameter running through the front edge 233 is aligned more inclined than the rear side wall 230 in the direction of flow F.

To further improve the deposit resistance and resistance to buildup, the transition from the rear side wall 230 to the connecting arms 203 is rounded in a transition region 242.

In the embodiment according to FIG. 2, the wedge-like shear blades 124 lie directly opposite the outer blades 127 in the radial direction. This results in a relatively high shear action and an oncoming flow which avoids deposits and adhesions or at least maintains a degree of flow that is tolerable for continuous operation.

Figure 3:
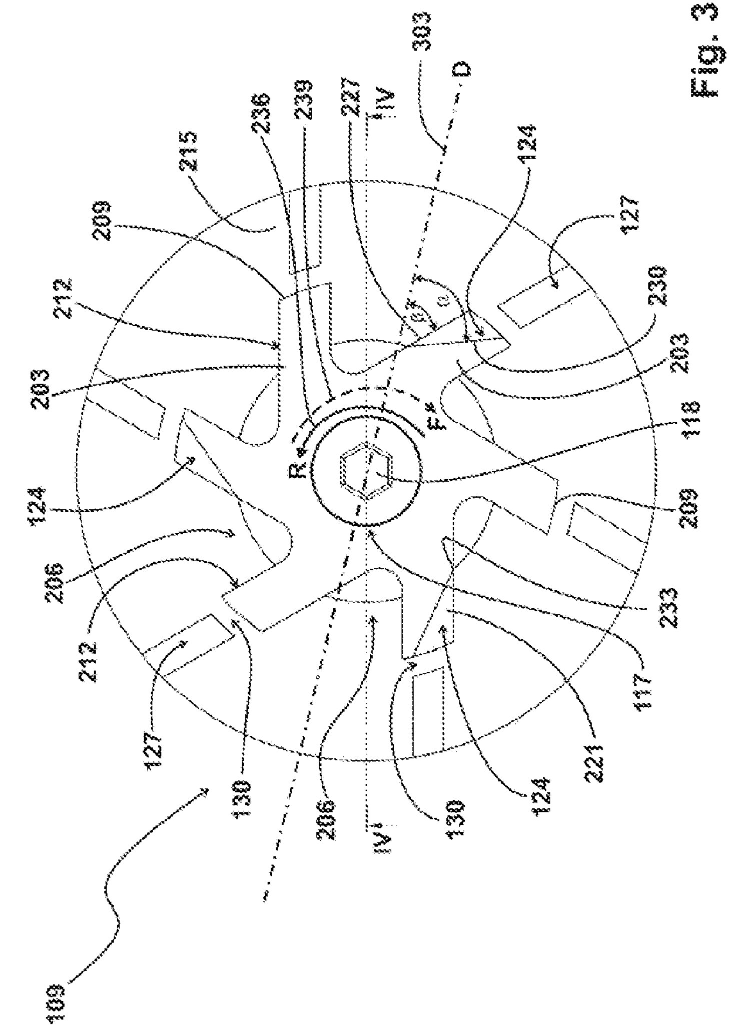
FIG. 3 is a top view of the embodiment of the rotor according to FIG. 2.

FIG. 3 is a top view of the embodiment of a rotor 109 according to the invention shown in FIG. 2. FIG. 3 shows that the wedge-shaped shear blades 124 are positioned with the front edge 233 in the direction of rotation R and at the front in relation to the direction of flow F, so that the side wall 230 located at the rear in the direction of flow F is based on the diameter D shown by a dash-dotted line 303 of the outer blade carrier plate 215 through the shaft receptacle 117 and through the front edge 233 at a relatively large angle α, for example approximately at right angles, while the front side wall 227 in the direction of flow F is positioned obliquely to this diameter D of the outer blade carrier plate 215 and thus more inclined relative to the direction of flow F at an angle β which is smaller than the angle α.

This results in an effective deflection radially outward at the front side wall 227 for the mixture of powder and liquid to pass through the mixing passage recesses 115 of the annular wall 112 of the stator 106 and thus a very effective mixing behavior, while the flow along the rear side wall 230 has a not insignificant proportion of laminar components, which help to avoid or reduce deposits and adhesions in this region.

Furthermore, the view according to FIG. 3 clearly shows that the liquid passage regions 206 create a direct transition in the axial direction from the side of the connecting arms 203 facing the outer blade carrier plate 215 to the side of the connecting arms 203 carrying the shear blades 124. This results in a relatively high throughput and presence of liquid.

Figure 4:
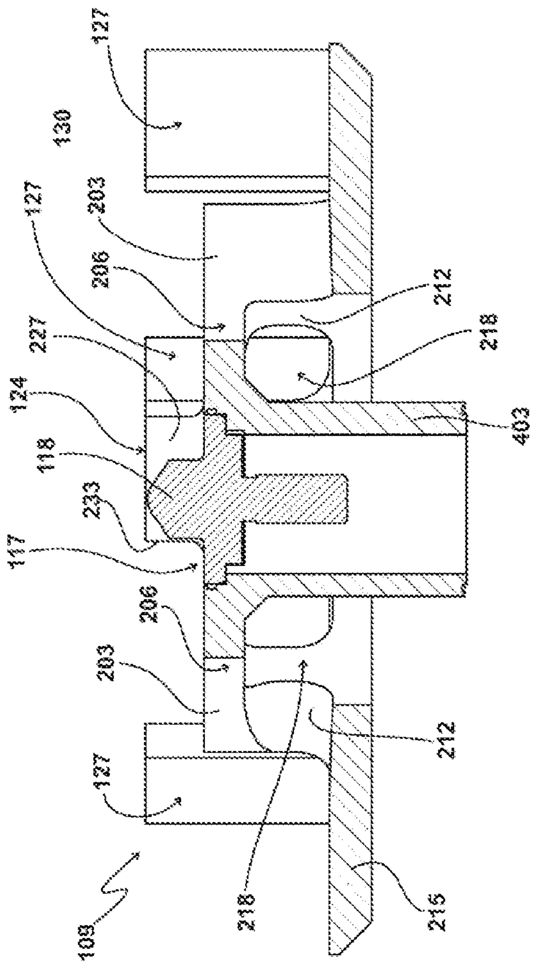
FIG. 4 is a sectional view of the embodiment of the rotor according to FIGS. 2 and 3.

FIG. 4 shows, in a sectional view along the line IV-IV of FIG. 3, the embodiment of a rotor 109 according to the invention explained with reference to FIGS. 2 and 3. It can be seen from the view according to FIG. 4 that the rotor 109 has a drive shaft receiving sleeve 403 which is set up to receive and fasten by means of the rotor fastening screw 118 of the drive shaft 121 (not shown in FIG. 4).

FIG. 4 also shows that, on the one hand, a direct connection between the two sides of the connecting arms 203 is created in the axial direction by the liquid outlet regions 206 acting as fluid dynamic free regions, while on the other hand, after a part of a liquid flow has been deflected in the radial direction in the region of the drive shaft receiving sleeve 403 adjoining the rotor fastening screw 118 through the liquid passage channels 218, liquid passes directly in the direction of an annular wall 112 (not shown in FIG. 4), which, when a stator 106 is arranged as intended, lies in the annular wall receiving gaps 130 formed between the shear blades 124 and the outer blades 127.

By changing the size of the liquid outlet regions 206, the proportions of the proportions of liquid exiting through the liquid outlet regions 206 and passing through the liquid passage channels 218 in the radial direction can be adapted to the respective mixing results to be achieved in order to achieve, in addition to a relatively high throughput, a relatively low tendency for powder to agglutinate due to a relatively high amount of liquid entering the powder side.

Figure 5:
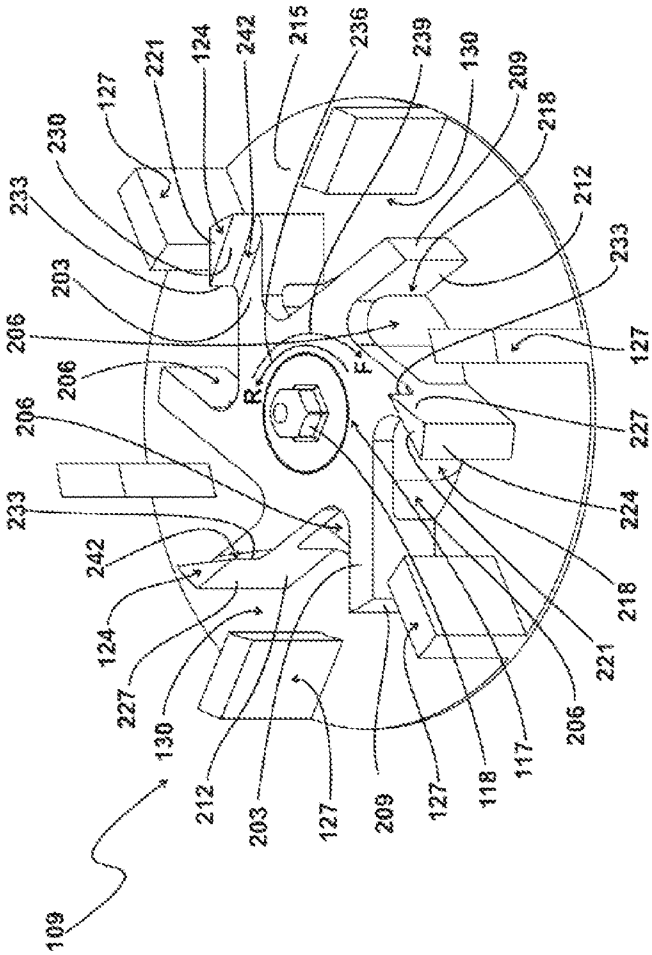
FIG. 5 is a perspective view of another embodiment of a rotor according to the invention.

FIG. 5 shows a perspective view of a further embodiment of a rotor 109 according to the invention, corresponding elements being provided with the same reference signs and not being explained in more detail below in the case of the embodiment of rotors 109 according to the invention explained with reference to FIG. 2, FIG. 3, and FIG. 4 and the embodiment of a rotor 109 explained with reference to FIG. 5 according to the invention.

The embodiment of a rotor 109 according to the invention explained with reference to FIG. 5 is modified from the embodiment of a rotor 109 according to the invention explained with reference to FIGS. 2 to 4 in that the wedge-like shear blades 124 are thus offset in the circumferential direction with respect to the outer blades 127. In the embodiment illustrated in FIG. 5, the wedge-like shear blades 124 lie in the circumferential direction between the outer blades 127. This results in a relatively high powder suction rate due to the arrangement of the wedge-like shear blades 124 downstream of the outer blades 127 in the direction of rotation R of the rotor 109.

Figure 6:
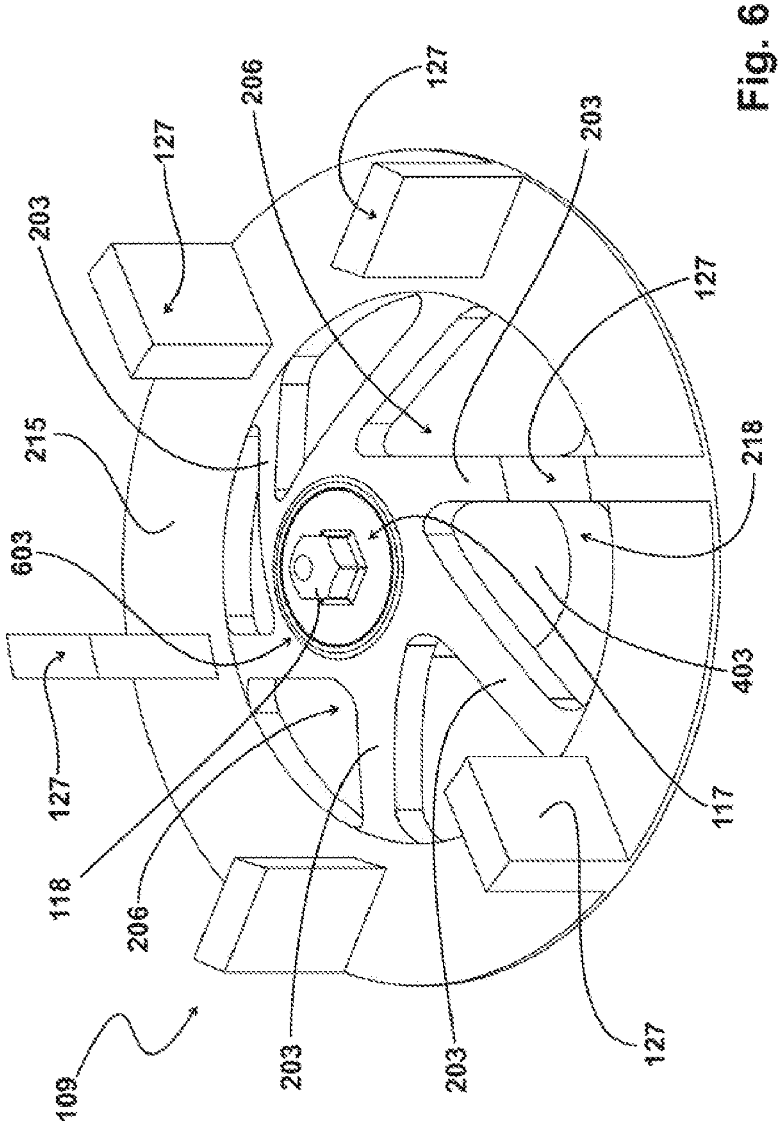
FIG. 6 is a perspective view of another embodiment of a rotor according to the invention.

FIG. 6 shows a perspective view of a further embodiment of a rotor 109 according to the invention, corresponding elements being provided with the same reference signs and not being explained in more detail below in the case of the embodiments of rotors 109 according to the invention explained with reference to FIGS. 2 to 5 and the embodiment of a rotor 109 explained with reference to FIG. 6 according to the invention.

The rotor 109 according to FIG. 6, in contrast to the embodiments explained above, only has outer blades 127 molded onto the outer blade carrier plate 205, while the connecting arms 203 extend in the axial direction of the outer blades 127 away from the receiving carrier plate 215 and are angled and form a dome 603 on the side, on which the outer blades 127 lie, in the raised region of which the shaft receptacle 117 and the rotor fastening screw 118 are arranged.

Figure 7:
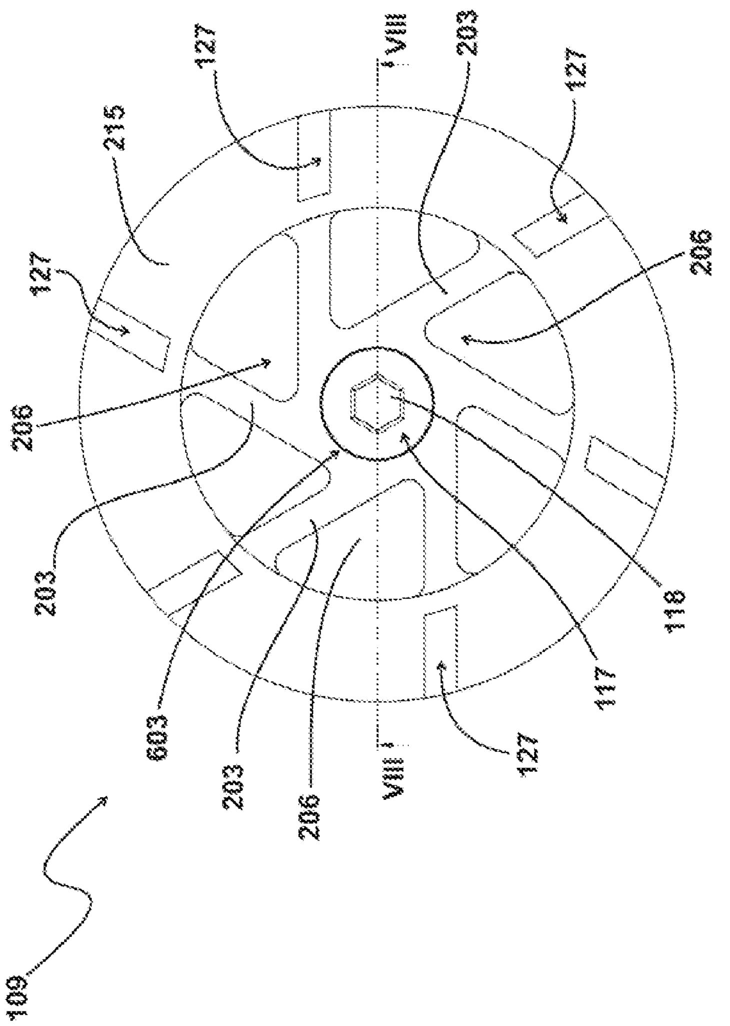
FIG. 7 is a plan view of the embodiment of the rotor according to FIG. 6.

FIG. 7 shows, in a plan view, the embodiment of a rotor 109 according to the invention explained with reference to FIG. 6. FIG. 7 shows that this rotor 109 has liquid outlet regions 206 extending very far radially inward as well as relatively filigree, star-like arranged connecting arms 203 and thus provides a relatively high proportion of liquid exiting in the axial direction with the result that the tendency for powder to agglutinate is particularly low in this embodiment.

Figure 8:
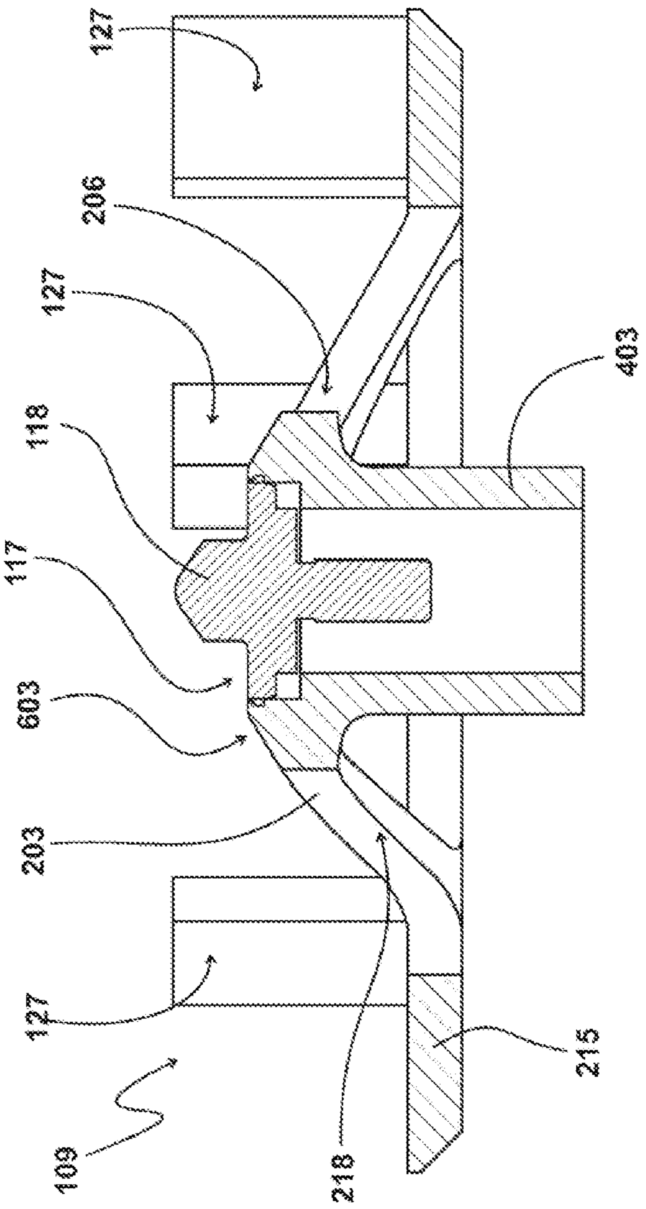
FIG. 8 is the embodiment of the rotor according to FIG. 6 in a sectional view.

FIG. 8 shows the embodiment, explained with reference to FIGS. 6 and 7, of a rotor 109 according to the invention in section along the line VIII-VIII of FIG. 7. It can be seen from FIG. 8 that the dome 603 is positioned approximately in the middle of the height of the outer blades 127 in the axial direction. It is also clear that the drive shaft receiving sleeve 403 is rounded on the outside in the region thereof adjoining the dome 603, so that, in this case, a portion of the fluid flowing radially outwardly past the drive shaft receiving sleeve 403 is deflected radially outward in the direction of the outer blade 127. This portion is then subjected to a pronounced shear action provided by the inclined connecting arms 203.

The invention claimed is:

1. Rotor for a device for mixing powder and liquid having an outer blade carrier plate, comprising a plurality of radially outwardly lying outer blades extending in an axial direction, which are formed on an outer blade carrier plate, and a connecting structure between an outer blade carrier plate and a centrally arranged shaft receptacle, wherein the connecting structure is formed by a plurality of connecting arms extending between the outer blade carrier plate and the shaft receptacle, characterized in that between the outer blade carrier plate and the plurality of connecting arms of the connecting structure having a strut-like configuration, lying in one plane and extending in a star-like manner away from the shaft receptacle, wherein a plurality of connecting webs are formed in an axial direction and in that radially inwardly tapering liquid outlet regions are present as free regions between the connecting arms, which liquid outlet regions extend in each case over the same angular sections and are regularly distributed over the circumference of the connecting arms.

2. Rotor according to claim 1, characterized in that the connecting arms lie in a plane oriented at right angles to the axial direction.

3. Rotor according to claim 1, characterized in that the connecting arms are set at an angle to the axial direction and form a dome, in the raised region of which the shaft receptacle is arranged.

4. Rotor according to claim 1, characterized in that a plurality of shear blades are arranged radially on the outside of the shaft receptacle are formed on connecting arms.

5. Rotor according to claim 1, characterized in that the connecting arms are aligned in the radial direction with the plurality of outer blades.

6. Rotor according to claim 1, characterized in that the connecting arms are offset in a circumferential direction with respect to the outer blades.

7. Device for mixing powder and liquid with a rotor having an outer blade carrier plate, comprising a plurality of radially outwardly lying outer blades extending in an axial direction, which are formed on an outer blade carrier plate, and a connecting structure between an outer blade carrier plate and a centrally arranged shaft receptacle, wherein the connecting structure is formed by the plurality of connecting arms extending between the outer blade carrier plate and the shaft receptacle, characterized in that between the outer blade carrier plate and the plurality of connecting arms of the connecting structure having a strut-like configuration, lying in one plane and extending in a star-like manner away from the shaft receptacle, wherein a plurality of connecting webs are formed in an axial direction and in that radially inwardly tapering liquid outlet regions are present as free regions between the connecting arms, which liquid outlet regions extend in each case over the same angular sections and are regularly distributed over the circumference of the connecting arms, wherein the supply of powder and liquid takes place on different sides of the connecting arms.

8. Device according to claim 7, characterized in that a stator is provided which has an annular wall provided with mixing passage recesses, the annular wall being arranged radially on the inside of the outer blades of the rotor.

9. Device according to claim 7, wherein the rotor is characterized in that the connecting arms lie in a plane oriented at right angles to the axial direction.

10. Device according to claim 7, wherein the rotor is characterized in that the connecting arms are set at an angle to the axial direction and form a dome, in the raised region of which the shaft receptacle is arranged.

11. Device according to claim 7, wherein the rotor is characterized in that shear blades arranged radially on the outside of the shaft receptacle are formed on connecting arms.

12. Device according to claim 7, wherein the rotor is characterized in that the connecting arms are aligned in the radial direction with outer blades.

13. Device according to claim 7, wherein the rotor is characterized in that the connecting arms are offset in the circumferential direction with respect to the outer blades.

* * * * *